US005079566A

United States Patent [19]

Mori

[11] Patent Number: 5,079,566

[45] Date of Patent: Jan. 7, 1992

[54] PRINTING APPARATUS WITH A PRINTHEAD HAVING STRATIFIED RECORDING ELECTRODES, RETURN ELECTRODE AND PREHEATING ELECTRODE FOR USE WITH RESISTIVE THERMAL TRANSFER RIBBON

[75] Inventor: Takashi Mori, Tokyo, Japan

[73] Assignee: Ricoh Company, Ltd., Tokyo, Japan

[21] Appl. No.: 594,327

[22] Filed: Oct. 9, 1990

[30] Foreign Application Priority Data

Oct. 11, 1989 [JP] Japan ................................ 1-264683

[51] Int. Cl.[5] ........................ B41J 2/395; G01D 15/06

[52] U.S. Cl. ........................... 346/76 PH; 346/139 C; 346/155

[58] Field of Search .............. 346/76 PH, 139 C, 155, 346/165; 400/120

[56] References Cited

FOREIGN PATENT DOCUMENTS 0028334 5/1981 European Pat. Off. ............ 400/120
0184866 8/1987 Japan .................................. 400/120

*Primary Examiner*—Benjamin R. Fuller
*Assistant Examiner*—Huan Tran
*Attorney, Agent, or Firm*—Cooper & Dunham

[57] ABSTRACT

An ink transferring printing mechanism includes an ink sheet having a resistance layer, a conductive layer and an ink layer which are stacked in this order, and a recording head. The recording head has a plurality of recording electrodes arranged in a line, each of which corresponds to a pixel in the image, a preheating electrode and a feedback electrode, each of said recording electrodes being positioned between the preheating electrode and the feedback electrode, at least each of the recording electrodes and the preheating electrode being integrated and stratified. Each of the recording electrodes, the preheating electrode and the feedback electrode are respectively in contact with the resistance layer of the ink sheet. A recording current corresponding to image information is supplied to each of the recording electrodes and a preheating current is supplied to the preheating electrode.

5 Claims, 2 Drawing Sheets

PRINTING APPARATUS WITH A PRINTHEAD HAVING STRATIFIED RECORDING ELECTRODES, RETURN ELECTRODE AND PREHEATING ELECTRODE FOR USE WITH RESISTIVE THERMAL TRANSFER RIBBON

BACKGROUND OF THE INVENTION

The present invention generally relates to an ink transferring printing mechanism, and more particularly to an ink transferring printing mechanism capable of rapidly printing an image on a recording sheet.

An ink transferring printing mechanism according to the present invention has an ink sheet including a resistance layer, a conductive layer, and an ink layer which are stacked in this order. In this ink transferring printing mechanism, a recording current supplied to each of a plurality of recording electrodes flows into the resistance layer and the conductive layer so that ink in the ink layer is transferred, by heat which is generated by the recording current in the resistance layer, to a recording sheet. Conventionally, to carry out rapid printing, the following ink transferring printing mechanism, in which the ink in the ink layer is preheated, has been proposed.

FIG. 1 is a cross sectional view showing an example of a conventional printing mechanism. Referring to FIG. 1, an ink sheet 22 is put between a recording electrode 21 and a recording sheet 29. The ink sheet 22 has a resistance layer 26, a conductive layer 27 and an ink layer 28 which are stacked in this order. A preheating electrode 25 is provided at a side of the recording electrode 21 so as to be separated from the recording electrode 21. A feedback electrode 23 is provided at another side of the recording electrode 21 so as to be also separated from the recording electrode 21. The preheating electrode 25 and the feedback electrode 23 are respectively in contact with a surface of the resistance layer 26 in the ink sheet 22. The ink sheet 22 is transported in a direction going from the preheating electrode 25 toward the feedback electrode 23, as indicated by an arrow in FIG. 1.

A recording current corresponding to image information supplied to the recording electrode 21 flows, via the resistance layer 26 and the conductive layer 27 of the ink sheet 22, in the feedback electrode 23. When the current flows via the resistance layer 26 and the conductive layer 27, the heat is generated in the resistance layer 26. Then, ink in the ink layer 28 of the ink sheet 22 is transferred by the heat generated in the resistance layer 26 to the recording sheet 29. Therefore, the image corresponding to the image information is formed on the recording sheet 29.

When an image is being recorded, a preheating current supplied to the preheating electrode 25 also flows via the resistance layer 26 and conductive layer 27 in the feedback electrode 23. Thus, the ink in the ink layer 28 is preheated by the heat generated in the resistance layer 26, through which the preheating current flows, and then the preheated ink is transferred, by the heat generated by the recording current supplied via the recording electrode 21 to the feedback electrode 23, to the recording sheet 29.

In the conventional printing mechanism, the ink in the ink layer 26 of the ink sheet 22 is preheated by the preheating electrode 25 before the ink is transferred by the recording electrode 21 to the recording sheet 29. However, the recording electrode 21 and the preheating electrode 25 are separated from each other so that the temperature of the preheated ink decreases before the ink is heated by the recording current supplied through the recording electrode 21. That is, it is difficult to sufficiently preheat the ink.

SUMMARY OF THE INVENTION

Accordingly, a general object of the present invention is to provide an ink transferring printing mechanism in which the above disadvantage of the aforementioned prior art is eliminated.

A more specific object of the present invention is to provide an ink transferring printing mechanism in which it is possible to sufficiently preheat the ink.

The above objects of the present invention are achieved by an ink transferring printing mechanism comprising an ink sheet having a resistance layer, a conductive layer and an ink layer which are stacked in this order, and a recording head, to which a recording current for printing an image and a preheating current for preheating an ink in the ink layer of the ink sheet are supplied from an external controller, having a plurality of recording electrodes arranged in a line, each of which corresponds to a pixel in the image, a preheating electrode and a feedback electrode, each of the recording electrodes being positioned between the preheating electrode and the feedback electrode, at least each of the recording electrodes and the preheating electrode being integrated and stratified, wherein end surfaces of each of the recording electrodes, the preheating electrode and the feedback electrode are respectively in contact with the resistance layer of the ink sheet which is transported in a direction going from the preheating electrode toward the feedback electrode, and wherein the recording current supplied to each of the recording electrodes flows via the resistance layer and the conductive layer of the ink sheet in the feedback electrode while the preheating current supplied to the preheating electrode flows via the resistance layer and the conductive layer of the ink sheet in the feedback electrode so that the ink in the ink layer, which is preheated by heat generated by the preheating current, is transferred by heat caused by the recording current to a recording sheet.

Additional objects, features and advantages of the present invention will become apparent from the following detailed description when read in conjunction with the accompanying drawings.

DESCRIPTION OF THE PREFERRED EMBODIMENTS

A description will now be given of a preferred embodiment of the present invention with reference to FIGS. 2 and 3.

Figure 1:
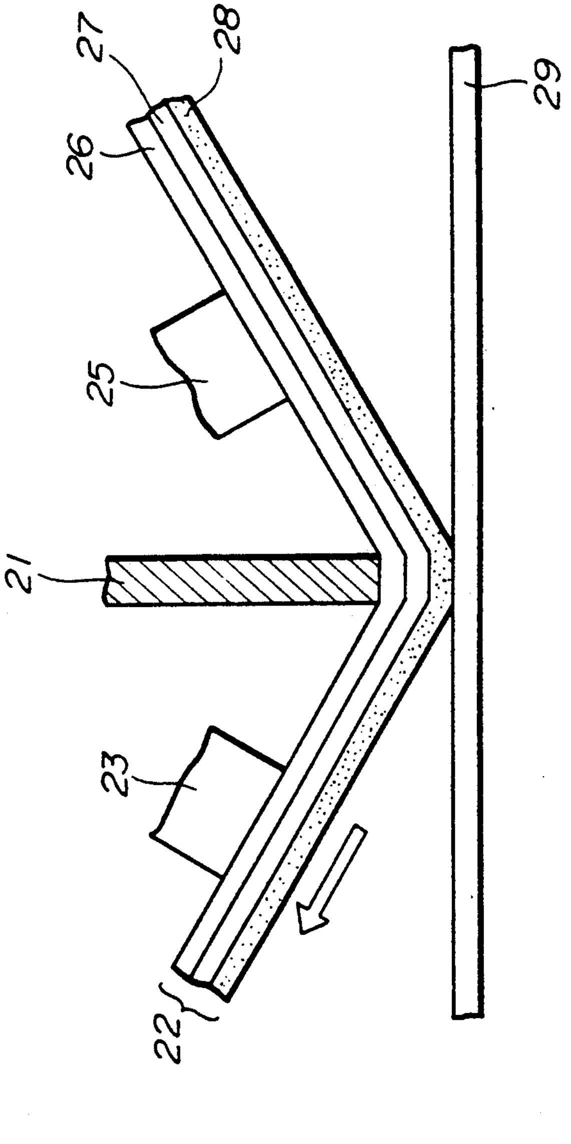
FIG. 1 PRIOR ART
FIG. 1 is a cross sectional view showing an example of a conventional printing mechanism.
Figure 2:
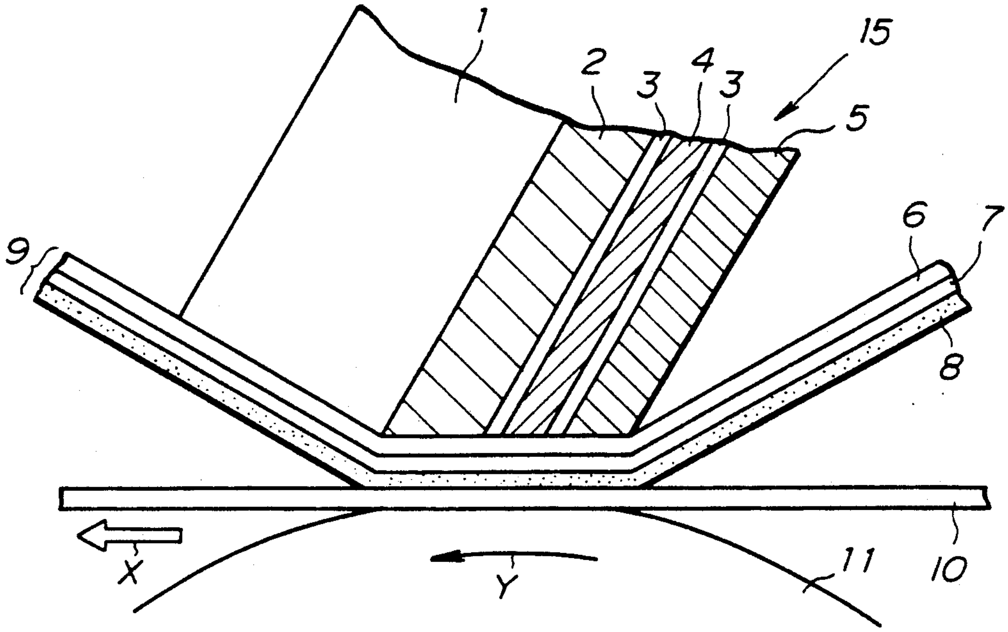
FIG. 2 is a cross sectional view showing a printing mechanism according to an embodiment of the present invention.

Referring to FIG. 2, in which a recording head is shown, a recording sheet 10 and a ink sheet 9 overlapping the recording sheet 10 are put between a recording head 15 and a platen roller 11. The platen roller 11 is, for example, made of fluororesin. The recording head 15 has a supporting base plate 1, a common electrode 2, insulating layers 3, recording electrodes 4 and a preheating electrode 5. The recording electrodes 4 are arranged in a line in a direction perpendicular to the sheet of FIG. 2. In the recording head 15, one of the insulating layers 3 is provided between the common electrode 2 and each of the recording electrodes 4 and another insulating layer 3 is provided between each of the recording electrodes 4 and the preheating electrode 5 so that each of the recording electrodes 4 is insulated from the common electrode 2 and the preheating electrode 5. The common electrode 2, the insulating layer 3, the recording electrodes 4, the other insulating layer 3 and the preheating electrode 5 are integrally stacked, and the common electrode 2 is fixed on the supporting base plate 1. That is, the common electrode 2, the recording electrodes 4 and the preheating electrode 5 are integrated on the supporting base plate 1. Each of the recording electrodes 4 corresponds to a pixel in an image, and an image signal for a pixel is supplied to each of the recording electrodes 4. The insulating layer 3 is, for example, made of ceramic. The supporting base plate 1 is, for example, made of aluminum. The ink sheet 9 has a resistance layer 6, a conductive layer 7 and an ink layer 8. End surfaces of the common electrode 2, the recording electrodes 4 and the preheating electrode 5 are respectively in contact with a surface of the resistance layer 6 of the ink sheet 9. The common electrode 2 corresponds to the feedback electrode 23 shown in FIG. 1, thus, currents supplied to the recording electrodes 4 and the preheating electrode 5 flow, via the resistance layer 6 and the conductive layer 7 of the ink sheet 9, into the common electrode 2. The platen roller 11 is rotated in a direction shown by an arrow Y so that the recording sheet 10 and the ink sheet 9 are respectively transported in a direction shown by an arrow X. That is, the ink sheet 9 is transported in a direction going from the preheating electrode 5 toward the common electrode 2.

Figure 3:
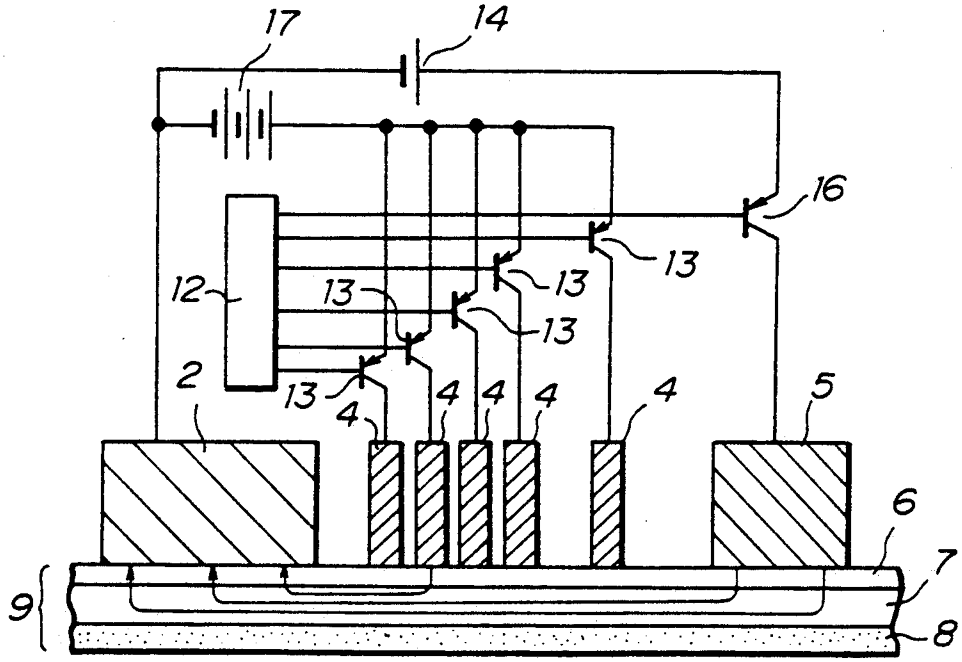
FIG. 3 is a circuit diagram of a driving circuit driving the printing mechanism shown in FIG. 2.

FIG. 3 shows a driving circuit for the recording head 15 shown in FIG. 2.

Referring to FIG. 3, the driving circuit has a control circuit 12, a plurality of transistors 13 for driving the recording electrodes 4 in the recording head 15, a transistor 16 for driving the preheating electrode 5 in the recording head 15, a driving power supply 17 and a preheating power supply 14. The control circuit 12 controls the transistors 13 so that each of the transistors 13 is turned on and off in accordance with the image information. A recording current output from the driving power supply 17 is supplied via each of the transistors 13, which are turned on, to a corresponding one of the recording electrodes 4. The control circuit 12 also controls the transistor 16 so that the transistor 16 is turned on and off. When the transistor 16 is turned on, a preheating current output from the preheating power supply 14 is supplied via the transistor 16 to the preheating electrode 5. An output voltage V1 of the driving power supply 17 is equal to or greater than an output voltage V2 of the preheating power supply 14 ($V1 \geqq V2$) so that it is possible to prevent the preheating electrode from printing an image.

An area S1 where the common electrode 2 is in contact with the ink sheet 9 is wider than an area S2 where the preheating electrode 5 is in contact with the ink sheet 9. The area S2 is wider than an area S3 where each of the recording electrodes 4 is in contact with the ink sheet 9. That is, the following inequality stands;

$$S1 > S2 > S3.$$

The control circuit 12 controls the transistors 13 so that each of the transistors 13 is turned on and off in accordance with the image information. A recording current output from the driving power supply 17 is supplied via each of transistors 13, which are turned on, to a corresponding one of the recording electrodes 4. The recording current supplied to corresponding one of the recording electrodes 4 flows, via the resistance layer 6 and the conductive layer 7 of the ink sheet 9, into the common electrode 2. Then the ink in the ink layer 8 is transferred by the heat, which is generated in the resistance layer 6 by the recording current, to the recording sheet 10. As a result, the image corresponding to the image information is formed on the recording sheet 10.

Immediately before the printing of the image is started and while the image is being printed on the recording sheet 10, a preheating current output from the preheating power supply 14 is supplied via the transistor 16 to the preheating electrode 5. The preheating current supplied to the preheating electrode 5 flows via the resistance layer 6 and conductive layer 7 into the common electrode 2. The heat is generated in the resistance layer 6 by the preheating current so that the ink in the ink layer 8 is preheated.

According to the present invention, the recording electrodes and the preheating electrode are integrated into a recording head so that it is possible to transfer the preheated ink to the recording sheet before the temperature of the ink reaches a predetermined low temperature. That is, it is possible to efficiently preheat the ink in the ink sheet. As a result, it is possible to rapidly print the image and the printing quality thereof is improved.

In addition, the common electrode, the recording electrodes and the preheating electrode are integrated into a recording head so that it is possible to miniaturize the recording mechanism.

The present invention is not limited to the aforementioned embodiments, and variations and modifications may be made without departing from the scope of the claimed invention.

What is claimed is:

1. A printing apparatus comprising:

an ink sheet having a resistance layer, a conductive layer and an ink layer which are stacked in this order;

a recording head having a plurality of recording electrodes arranged in a line, each of which corresponds to a pixel in an image, a preheating electrode and a feedback electrode, each of said recording electrodes being positioned between said preheating electrode and said feedback electrode, at least each of said recording electrodes and said preheating electrode being integrated and stratified, said recording head being in contact with said ink sheet so that end surfaces of each of said recording electrodes, said preheating electrode and said feedback electrode are respectively in contact with said resistance layer of said ink sheet which is transported in a direction going from said preheating electrode toward said feedback electrode;

first power supplying means for applying a first voltage across said preheating electrode and said feedback electrode so that a preheating current for preheating ink in said ink layer of said ink sheet is supplied from said preheating electrode via said resistance layer and said conductive layer of said ink sheet to said feedback electrode; and second power supplying means for applying a second voltage across each of said recording electrodes and said feedback electrode so that a recording current for printing the image is supplied from each of said recording electrodes via said resistance layer and said conductive layer of said ink sheet to said feedback electrode;

wherein said second voltage is greater than said first voltage, and wherein the ink in said ink layer, which is preheated by heat generated by the preheating current, is transferred by heat caused by the recording current to a recording sheets;

wherein a first insulating member is provided between each of said recording electrodes and said preheating electrode and a second insulating member is provided between each of said recording electrodes and said feedback electrode, said preheating electrode, said first insulating member, each of said recording electrodes, said second insulating member and said feedback electrode being integrated and stratified; and a first area where said feedback electrode is in contact with said resistance layer of said ink sheet is wider than a second area where said preheating electrode is in contact with said resistance layer of said ink sheet and the second area is wider than a third area where each of said recording electrodes is in contact with said resistance layer of said ink sheet.

2. A printing apparatus as claimed in claim 1, wherein said feedback electrode is fixed on a base member so that said base member, said feedback electrode, said first insulating member, each of said recording electrodes, said second insulating member and said preheating electrode are integrated and stratified.

3. A printing apparatus as claimed in claim 2, wherein said base member is made of aluminum.

4. A printing apparatus as claimed in claim 1, wherein both said first and second insulating members are made of ceramic.

5. Apparatus for printing with an ink sheet having a resistance layer, a conductive layer and an ink layer which are stacked in this order, comprising:

a recording head having a plurality of recording electrodes arranged in at least one line, each recording electrode corresponding to a pixel in an image, a preheating electrode and a feedback electrode, each of said recording electrodes being positioned between said preheating electrode and said feedback electrode, at least each of said recording electrodes and said preheating electrode being integrated and stratified, said recording head being in contact with said ink sheet so that end surfaces of each of said recording electrodes, said preheating electrode and said feedback electrode are respectively in contact with said resistance layer of said ink sheet which is transported in a direction going form said preheating electrode toward said feedback electrode;

first power supplying means for applying a first voltage across said preheating electrode and said feedback electrode to supply a preheating current for preheating ink in said ink layer of said ink sheet flowing from said preheating electrode via said resistance layer and said conductive layer of said ink sheet to said feedback electrode; and second power supplying means for applying a second voltage across each of said recording electrodes and said feedback electrode to supply a recording current for printing the image is supplied from each of said recording electrodes via said resistance layer and said conductive layer of said ink sheet flowing to said feedback electrode;

wherein said second voltage is greater than said first voltage, and wherein the ink in said ink layer, which is preheated by heat generated by the preheating current, is transferred by heat caused by the recording current to a recording sheet; and wherein a first insulating member is provided between each of said recording electrodes and said preheating electrode and a second insulating member is provided between each of said recording electrodes and said feedback electrode, said preheating electrode, said first insulating member, each of said recording electrodes, said second insulating member and said feedback electrode being integrated and stratified; and a first area where said feedback electrode is in contact with said resistance layer of said ink sheet is wider than a second area where said preheating electrode is in contact with said resistance layer of said ink sheet and the second area is wider than a third area where each of said recording electrodes is in contact with said resistance layer of said ink sheet.

* * * * *